US009416818B2

United States Patent
Hosen et al.

(10) Patent No.: US 9,416,818 B2
(45) Date of Patent: Aug. 16, 2016

(54) DUST COVER FOR BALL JOINT

(71) Applicant: NOK CORPORATION, Tokyo (JP)

(72) Inventors: Tatsuro Hosen, Makinohara (JP); Takayoshi Iwasaka, Makinohara (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 14/653,508

(22) PCT Filed: Nov. 11, 2013

(86) PCT No.: PCT/JP2013/080371
§ 371 (c)(1),
(2) Date: Jun. 18, 2015

(87) PCT Pub. No.: WO2014/097767
PCT Pub. Date: Jun. 26, 2014

(65) Prior Publication Data
US 2015/0337893 A1    Nov. 26, 2015

(30) Foreign Application Priority Data
Dec. 19, 2012 (JP) ................................. 2012-276383

(51) Int. Cl.
*F16C 11/00* (2006.01)
*F16C 11/06* (2006.01)
(Continued)

(52) U.S. Cl.
CPC ............ *F16C 11/0671* (2013.01); *F16J 3/041* (2013.01); *F16J 3/042* (2013.01); *F16J 15/52* (2013.01); *F16C 2226/12* (2013.01); *F16C 2226/70* (2013.01); *F16C 2226/76* (2013.01); *Y10T 403/16* (2015.01)

(58) Field of Classification Search
None
See application file for complete search history.

(56) References Cited

U.S. PATENT DOCUMENTS 3,175,834 A * 3/1965 Wallace ................. B60G 7/005
277/635
3,279,834 A * 10/1966 Budzynski .......... F16C 11/0671
277/390
(Continued)

FOREIGN PATENT DOCUMENTS

DE          10-207779 C1     10/2003
DE      10-2008-043248 A1    5/2010
(Continued)

OTHER PUBLICATIONS

Extended European Search Report for Application No. EP 13 86 3955 dated Jan. 22, 2016 (7 pages).

*Primary Examiner* — Victor MacArthur
(74) *Attorney, Agent, or Firm* — Harness, Dickey & Pierce, P.L.C.

(57) ABSTRACT

An object of the invention is to provide a dust cover for a ball joint which can suppress generation of a so-called mouth opening phenomenon in a small-diameter opening portion even under a low-temperature atmosphere, can effectively inhibit a seal performance from being lowered in the small-diameter opening portion and inhibit the sedimentation or the garbage from entering into a dust cover from an external portion, and has a good sealing performance. For this purpose, in a dust cover for a ball joint having a spherical head portion, a shaft, one end large-diameter opening portion, the other end small-diameter portion, and a film portion, concavo-concave engagement is formed between an inner peripheral surface of the rigid ring and an outer peripheral surface of a retainer having a cylindrical portion which is fitted and retained to an outer peripheral surface of the shaft.

5 Claims, 4 Drawing Sheets

(51) Int. Cl.
*F16J 3/04* (2006.01)
*F16J 15/52* (2006.01)

(56) References Cited

U.S. PATENT DOCUMENTS 3,472,540 A * 10/1969 Gottschald ............ B60G 7/005
  277/504
7,070,355 B2 * 7/2006 Abels .................. F16C 11/0671
  277/634
2004/0028302 A1 * 2/2004 Abels .................. F16C 11/0671
  384/206

FOREIGN PATENT DOCUMENTS

| | | |
|---|---|---|
| JP | S55-22520 U | 6/1980 |
| JP | S62-137408 A | 6/1987 |
| JP | H02-138219 U | 11/1990 |
| JP | H03-121211 U | 12/1991 |
| JP | H03-123161 U | 12/1991 |
| JP | H07-158631 A | 6/1995 |

* cited by examiner

DUST COVER FOR BALL JOINT

CROSS-REFERENCE TO RELATED APPLICATIONS

This application is a 371 U.S. National Stage Application of International Application No. PCT/JP2013/080371, filed on Nov. 11, 2013, and published in Japanese as WO 2014/097767 A1 on Jun. 26, 2014. This application claims priority to Japanese Application No. 2012-276383, filed on Dec. 19, 2012. The entire disclosures of the above applications are incorporated herein by reference.

BACKGROUND OF THE INVENTION

1. Field of the Invention

The present invention relates to a dust cover for a ball joint.

Further, the present invention relates to a dust cover for a ball joint which is used in an automobile suspension device, and a steering device.

2. Description of the Conventional Art

Conventionally, as a ball joint to which a dust cover is installed for the purpose of a dust prevention and a water prevention in a ball joint coupling portion, there has been known a dust cover for a ball joint which is described in FIG. 5 (Japanese Unexamined Patent Publication No. 62-137408).

In a seal structure of this kind of ball joint dust cover, a spherical head portion 200 formed in one end of a ball stud 100 is retained within a socket 300.

Further, a shaft 400 in the other end of the ball stud 100 is fastened and fixed to a knuckle 500.

On the other hand, a one end large-diameter opening portion 800 having an approximately C-shaped cross sectional shape of a dust cover 600 made of an elastic material is fixed and retained within an annular groove portion 310 which is formed in an outer peripheral surface of the socket 300 by an annular pressure ring 700, and the other end small-diameter opening portion 150 is retained to the shaft 400.

The pressure ring 700 employs a circlip which approximately has a rectangular cross sectional shape.

In this kind of conventional dust cover 600 made of the elastic material, in the case that the ball stud 100 oscillates in a state in which the ball stud 100 is inclined as shown in FIG. 5, a force extending the small-diameter opening portion 150 is applied in a side in which a film portion of the dust cover 600 made of the elastic material extends (a right side on the drawing). Therefore, there is generated a so-called mouth opening phenomenon of the small-diameter portion 150 in which a lip portion of the small-diameter opening portion 150 and the knuckle 500 is disconnected.

As a result, a seal performance in the small-diameter portion 150 is lowered, and a problem that sedimentation or garbage enters into the dust cover 600 from an external portion has been brought about.

Particularly, the rubber constructing the dust cover 600 made of the elastic material loses an elasticity under a low-temperature atmosphere, and a following property of the film portion is lowered in relation to an oscillating motion of the ball joint. As a result, it has been known that the mouth opening phenomenon in which the seal lip portion moves away from the shaft 400 is remarkably generated.

As one of methods for taking measures to the phenomenon, there has been attempts to improve the sealing performance by fitting a retainer having an L-shaped cross section to an outer peripheral surface of the ball stud and closely attaching the dust lip provided in the small-diameter opening portion to the retainer side. However, the mouth opening phenomenon can not be sufficiently resolved.

SUMMARY OF THE INVENTION

Problem to be Solved by the Invention

The present invention is made by taking the problem mentioned above into consideration, and an object of the present invention is to provide a dust cover for a ball joint which can suppress generation of a so-called mouth opening phenomenon in a small-diameter opening portion even under a low-temperature atmosphere, can effectively inhibit the sedimentation or the garbage from entering into a dust cover from an external portion since a seal performance is not lowered in the small-diameter opening portion, and has a good sealing performance.

Means for Solving the Problem

A dust cover for a ball joint according to the present invention is a dust cover for a ball joint structured such that a spherical head portion formed in one end of a ball stud is retained within a socket, a shaft in the other end of the ball stud is fastened and fixed to a knuckle, a one end large-diameter opening portion is fixed and retained to an outer peripheral surface of the socket, the other end small-diameter portion having a rigid ring integrally formed therein is retained to the shaft, having a film portion which connects the one end large-diameter opening portion and the other end small-diameter opening portion, and made of a rubber-like elastic material, wherein concavo-concave engagement is formed between an inner peripheral surface of the rigid ring and an outer peripheral surface of a retainer having a cylindrical portion which is fitted and retained to an outer peripheral surface of the shaft.

Effect of the Invention

The present invention achieves effects described below.

According to the dust cover for the ball joint of the invention described in the first aspect, the dust cover for the ball joint is structured such that the concavo-concave engagement is formed between the inner peripheral surface of the rigid ring and the outer peripheral surface of the retainer having the cylindrical portion which is fitted and retained to the outer peripheral surface of the shaft. As a result, it is possible to securely suppress generation of the mouth-opening phenomenon of the small-diameter opening portion, and it is possible to more effectively inhibit the sedimentation or the garbage from entering into the dust cover from the external portion since the seal performance is not lowered in the small-diameter opening portion.

Further, according to the dust cover for the ball joint of the invention described in the second aspect, the concavo-convex engagement is formed by an annular concave portion which is provided in the inner peripheral surface of the rigid ring, and an annular convex portion which is provided in the outer peripheral surface of the retainer. As a result, it is easy to manufacture, the engagement is achieved circumferentially uniformly, and it is possible to effectively suppress the generation of the so-called mouth-opening phenomenon of the small-diameter opening portion in relation to oscillation motions in every directions.

Further, according to the dust cover for the ball joint of the invention described in the third aspect, the retainer is provided with a flange which extends outward in a diametrical direction from one end in an axial direction of the retainer. As a result, it is easy to assemble the retainer, and it is possible to securely suppress the generation of the so-called mouth-opening phenomenon of the small-diameter opening portion.

Further, according to the dust cover for the ball joint of the invention described in the fourth aspect, a seal lip comes into contact with the outer peripheral surface of the retainer in a sealing manner, the seal lip being provided in the other end small-diameter opening portion and being made of a rubber-like elastic material. As a result, it is possible to more effectively inhibit the sedimentation or the garbage from entering into the dust cover from the external portion.

DETAILED DESCRIPTION OF PREFERRED EMBODIMENT

Figure 1:
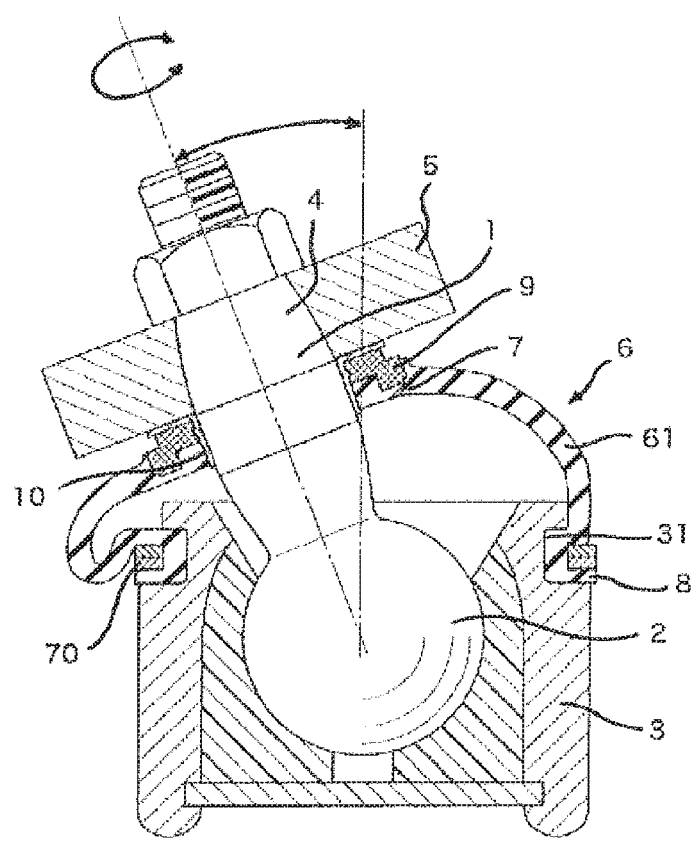
FIG. 1 is a vertical cross sectional view of a dust cover for a ball joint according to the present invention.

A description will be given below of an embodiment for carrying out the present invention.

As shown in FIGS. 1 to 4, a dust cover for a ball joint according to the present invention is basically structured such that a spherical head portion 2 formed in one end of a ball stud 1 is retained within a socket 3, a shaft 4 in the other end of the ball stud 1 is fastened and fixed to a knuckle 5, a one end large-diameter opening portion 8 is fixed and retained to an outer peripheral surface of the socket 3, the other end small-diameter portion 7 having a resin material rigid ring 9 integrally formed therein is retained to the shaft 4, and a film portion 61 is provided for connecting the one end large-diameter opening portion 8 and the other end small-diameter opening portion 7.

Figure 2:
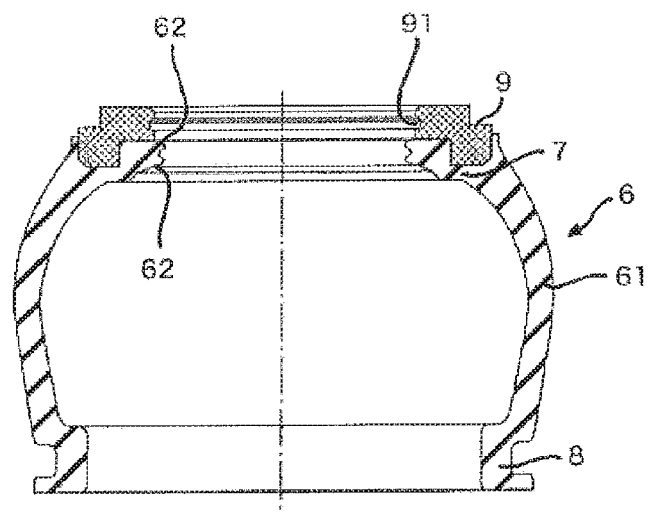
FIG. 2 is a vertical cross sectional view of a dust cover single body shown in FIG. 1 before being installed.

Further, as shown in FIG. 2, an annular concave portion 91 is formed in an inner peripheral surface of the rigid ring 9.

Figure 3:
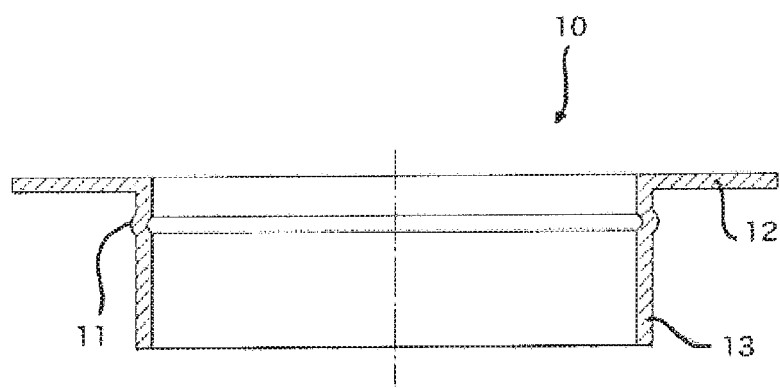
FIG. 3 is a vertical cross sectional view of a retainer single body shown in FIG. 1 before being assembled.
Figure 4:
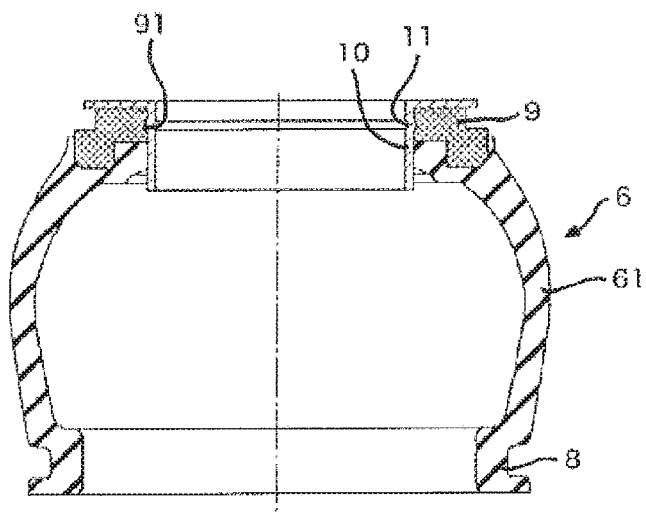
FIG. 4 is a vertical cross sectional view of a state in which the retainer in FIG. 3 is assembled in the dust cover in FIG. 2.
Figure 5:
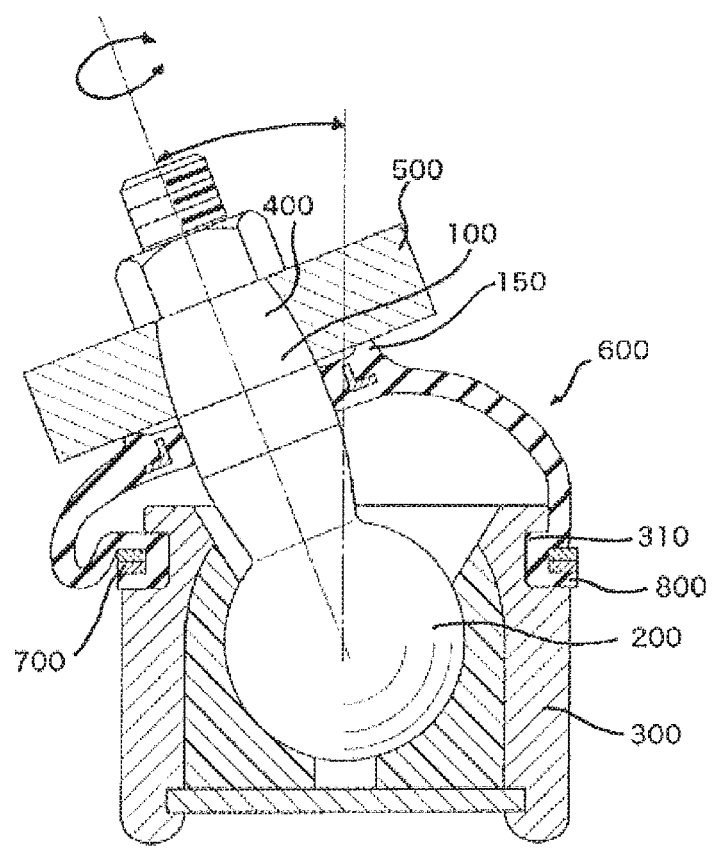
FIG. 5 is a vertical cross sectional view of a dust cover for a ball joint according to a prior art.

On the other hand, as shown in FIGS. 1, 3 and 4, an annular convex portion 11 is formed in an outer peripheral surface of a cylindrical portion 13 of a retainer 10 which is fitted and retained to an outer peripheral surface of the shaft 4 and is made of a metal material. The convex portion 11 is formed by deforming the cylindrical portion 13, however, the convex portion 11 may be formed by bonding the other member to the outer peripheral surface of the cylindrical portion 13.

Further, an annular convex portion may be formed in the outer peripheral surface of the cylindrical portion 13 of the retainer 10, and an annular concave portion may be formed in the inner peripheral surface of the rigid ring 9, thereby forming the concavo-convex engagement.

Further, as shown in FIG. 4, the concave portion 91 and the convex portion 11 are engaged with each other while having a fixed fastening margin.

It is preferable that the fastening margin is normally set to 0 to 1 mm/dia.

In the present embodiment, the concave portion 91 and the convex portion 11 are both provided as one streak portions, however, may be both provided as two streaks portions. Further, the structure may be made such that a plurality of projections and concaves provided circumferentially uniformly are engaged.

Further, various shapes such as a circular shape, a rectangular shape and a triangular shape can be applied to cross sectional shapes of the concave portion 91 and the convex portion 11.

Since the structure mentioned above is employed, it is possible to securely suppress the generation of the mouth-opening phenomenon of the small-diameter opening portion 7, and it is possible to more effectively inhibit the sedimentation or the garbage from entering into the dust cover from the external portion since the sealing performance in the small-diameter opening portion 7 is lowered.

Further, the retainer 10 may be constructed only by the cylindrical portion 13 which is fitted and retained to the outer peripheral surface of the shaft 4, however, is preferably structured, as shown in FIG. 3, such that the retainer 10 is provided with a flange 12 which extends outward in a diametrical direction from one end (an upward direction of the drawing) in an axial direction thereof.

As a result, it is easy to assemble the retainer 10, and it is possible to securely suppress the generation of the so-called mouth-opening phenomenon of the small-diameter opening portion 7.

Inversely to the aspect shown in FIGS. 1, 3 and 4, in the case that the flange 12 is structured such as to extend outward in the diametrical direction from an end portion in the spherical head portion 2 side (in a lower side of the drawing) of the cylindrical portion 13, it is possible to more securely inhibit the movement of the small-diameter opening portion 7 to the spherical head portion 2 side (the lower side of the drawing).

Further, an outer peripheral surface of the retainer 10 is provided with two seal lips 62 and 62 which extend from the film portion 61 and is made of a rubber-like elastic material, closer to the spherical head portion 2 side (the lower side of the drawing) than the rigid ring 9 of the other end small-diameter opening portion 7, in such a manner as to be in contact therewith in a sealing manner.

As a result, it is possible to more effectively inhibit the sedimentation or the garbage from entering into the dust cover from the external portion.

In the present embodiment, the seal lips 62 are structured such that two seal lips are provided, however, at least one seal lip may exist.

As the materials of the rigid ring 9 and the retainer 10, a metal or a resin is selectively used appropriately in correspondence to the intended use.

Further, the material of the elastic material dust cover 6 is appropriately selected and used in correspondence to the intended use from a rubber-like elastic material such as a chloroprene, and a thermoplastic elastomer such as a polyester elastomer and a thermoplastic polyurethane.

Further, grease is sealed within the elastic material dust cover 6.

On the other hand, the one end large-diameter opening portion 8 having the approximately C-shaped cross sectional shape of the elastic material dust cover 6 is structured such as to be fixed and retained into an annular groove portion 31 which is formed in the outer peripheral surface of the socket 3 by an annular pressing ring 70.

A circlip having an approximately rectangular cross sectional shape is used for the pressing ring 70.

Further, a method of fixing the one end large-diameter opening portion 8 to the socket 3 may employ a method of press fitting a reinforcing ring which is vulcanization bonded to the one end large-diameter opening portion 8 into the socket 3.

Further, the present invention is not limited to the best mode for carrying out the invention mentioned above, but can of course employ the other various structures without deflecting the scope of the present invention.

INDUSTRIAL APPLICABILITY

The present invention can be used in the ball joint which is used in the suspension device and the steering device of the motor vehicle.

What is claimed is:

1. A ball joint comprising:
    a spherical head portion formed in one end of a ball stud, the spherical head portion being retained within a socket;
    a shaft provided in the other end of said ball stud, the shaft being fastened and fixed to a knuckle;
    a dust cover including:
        a one end large-diameter opening portion fixed and retained to an outer peripheral surface of said socket;
        the other end small-diameter portion having a rigid ring integrally formed therein, the other end small-diameter portion being retained to said shaft; and
        a film portion connecting said one end large-diameter opening portion and said other end small-diameter opening portion; and
    wherein the film portion is made of an elastic material
    wherein concavo-concave engagement is formed between an inner peripheral surface of said rigid ring and an outer peripheral surface of a retainer having a cylindrical portion which is fitted and retained to an outer peripheral surface of said shaft, the cylindrical portion including a convex bead that extends radially outward from the shaft, and the inner peripheral surface of the rigid ring including a concave recess that directly mates with the convex bead, and wherein said retainer is provided with a flange which extends outward in a radial direction from one end of the retainer.

2. The ball joint according to claim 1, wherein the concave recess and the convex bead are annular.

3. The ball joint according to claim 2, wherein a seal lip comes into contact with the outer peripheral surface of said retainer in a sealing manner, the seal lip being provided in said other end small-diameter opening portion and being made of an elastic material.

4. The ball joint according to claim 1, wherein a seal lip comes into contact with the outer peripheral surface of said retainer in a sealing manner, the seal lip being provided in said other end small-diameter opening portion and being made of an elastic material.

5. The ball joint according to claim 1, wherein a seal lip comes into contact with the outer peripheral surface of said retainer in a sealing manner, the seal lip being provided in said other end small-diameter opening portion and being made of an elastic material.

* * * * *